United States Patent
Cohen et al.

[19]

[11] Patent Number: 6,158,233
[45] Date of Patent: Dec. 12, 2000

[54] VACUUM INSULATED REFRIGERATOR OR FREEZER CABINET

[75] Inventors: Ilan Cohen, Stockholm; Anders Haegermarck, Trångsund, both of Sweden

[73] Assignee: Aktiebolaget Electrolux, Stockholm, Sweden

[21] Appl. No.: 09/247,691

[22] Filed: Feb. 10, 1999

[30] Foreign Application Priority Data

Feb. 12, 1998 [SE] Sweden ................................. 9800404

[51] Int. Cl.[7] ........................................................ F25B 1/00
[52] U.S. Cl. ............................................. 62/268; 220/641
[58] Field of Search ...................... 62/440, 268; 220/641, 220/657

[56] References Cited

U.S. PATENT DOCUMENTS

| | | | |
|---|---|---|---|
| 769,271 | 9/1904 | Norquist | 220/641 |
| 4,405,058 | 9/1983 | Phalin | 220/641 |
| 5,361,598 | 11/1994 | Roseen | 62/229 |

FOREIGN PATENT DOCUMENTS

| | | |
|---|---|---|
| 0 587 546 A1 | 3/1994 | European Pat. Off. . |
| 1416869 | 9/1965 | France . |
| 956 899 | 1/1957 | Germany . |
| 1107545 | 3/1968 | United Kingdom . |
| 2 140 143 | 11/1984 | United Kingdom . |

*Primary Examiner*—William E. Tapolcai
*Attorney, Agent, or Firm*—Pearne & Gordon LLP

[57] ABSTRACT

The walls of a refrigerator or freezer cabinet comprise an inner shell (20) of plastic, an outer shell (22) of plastic and an evacuated heat insulation (28) between the shells. The cabinet is permanently provided with a vacuum pump (30), which keeps the insulation evacuated. Each one of the inner shell (20) and the outer shell (22) has at an access opening (16) of the cabinet an end part (24 and 26, respectively), both of which being directed out from the opening (16) and joined together along a surface (21), which like a band extends around the opening in parallel with its plane (16).

2 Claims, 1 Drawing Sheet

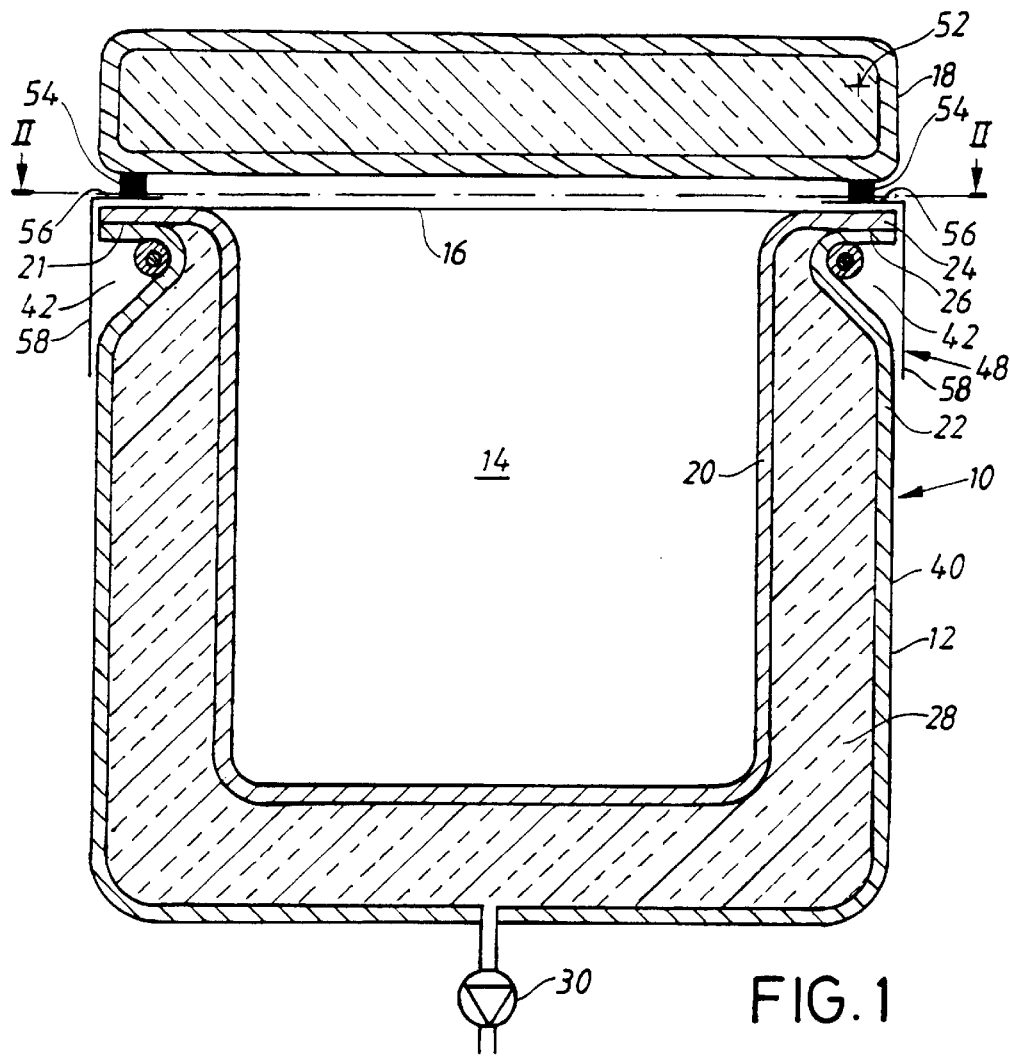
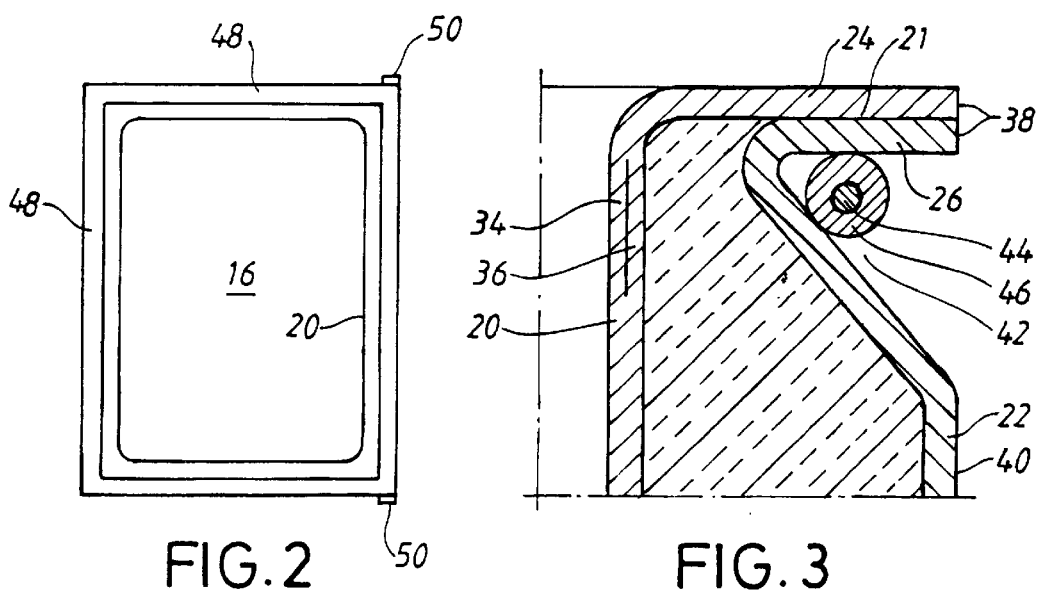
FIG. 1
FIG. 2
FIG. 3

VACUUM INSULATED REFRIGERATOR OR FREEZER CABINET

The invention refers to a refrigerator or freezer cabinet, the walls of which comprising an inner shell of plastic, an outer shell of plastic and an evacuated heat insulation between the shells, the cabinet being permanently provided with a pump for evacuating the insulation.

Such a cabinet is known through EP-0587548-A1, where it in claim 9 is mentioned, that the shells can be made of plastic. Further details about the shells are not evident from said publication.

The object of the invention is to bring about a joint between the shells which is easy to make such that it becomes tight and furthermore has a shape which fits a refrigerator or freezer cabinet.

This object is reached by the cabinet according to the invention thereby that each one of the inner shell and the outer shell at an access opening of the cabinet has an end part, both of which being directed away from the opening in planes which are parallel with the plane of the opening, the end parts being joined together by means of welding or gluing along a surface, which extends around the opening and is parallel with the plane of the opening.

In such a surface the shells can easily be joined together to a tight joint by means of welding or gluing.

An embodiment of a cabinet according to the invention is described below in connexion with the enclosed drawing, in which FIG. 1 shows a horizontal sectional view of the cabinet with a door and a pump for evacuating an insulation of the cabinet, FIG. 2 shows a reduced view of the cabinet according to the marking II—II in FIG. 1, and FIG. 3 shows an enlarged part of a joint between an inner shell and an outer shell in FIG. 1.

By 10 is designated a refrigerator or freezer cabinet comprising a cabinet body 12 with a room 14 for storing goods. The room 14 is refrigerated by an evaporator (not shown) of a refrigerating apparatus (not shown). Access to the room 14 takes place through a rectangular access opening 16 after a door 18 has been opened. The cabinet body 12 is constituted by a box-like inner shell 20, which is made in one piece of plastic, and a box-like outer shell 22, which also is made in one piece of plastic. As well the end part 24 of the inner shell as the end part 26 of the outer shell are directed out from the opening 16 and are by means of welding or gluing joined together along a surface 21, which like a band extends around the access opening in parallel with its plane 16. The space 28 between the shells 20 and 22 are filled with an insulating material, e.g. in the form of foamed plastic, a powder or fibres.

A vacuum pump 30, which is permanently arranged on the cabinet, evacuates air, humidity and other substances, which diffuse through the shells 20 and 22 into the space 28 from the ambient atmosphere, so that a satisfying heat insulating vacuum of the magnitude of 0.1–10 mbar is maintained in the space 28. Such a pump 30 can work continuously or intermittently and be electrically driven, its average consumption of electric power being of the magnitude of 2–10 watt.

By a certain diffusion thus being allowed through the shells 20 and 22, these can, compared with shells which are completely diffusion tight, be made so much cheaper, that the cost for the vacuum pump 30 and its operation is outbalanced.

The respective shell 20 and 22 can consist of a laminate of different plastics, so that a satisfying balance between mechanical strength, diffusion preventing capability and workability at for instance vacuum forming is obtained.

The outer shell 22, at which the diffusion tendency is greatest as it is the warmest shell, can consist of one single, 2 mm thick layer of mineral filled PE (polyethylene), which has a combination of good mechanical strength, good barrier qualities against diffusion and good workability.

The inner shell 20 can consist of an inner, 1.7 mm thick layer 34 of PS (polystyrene) laminated by an interposed adherence layer with an outer, 0.3 mm thick layer 36 of PE.

By covering the shells with aluminium foil, a barrier plastic film or a diffusion preventing varnish, the diffusion into the space 28 can be reduced when necessary.

The end parts 24 and 26 have an end surface 38, which is located on level with the outer surface 40 of the outer shell 22. Beneath the end part 26 of the outer shell 22 a groove 42 is formed in the outer shell. The groove 42, which extends around the opening 16, serves during manufacturing of the cabinet body 12 to house one half of a tool for keeping the end parts 24 and 26 pressed against each other, when they are welded or glued together.

The welding can take place by a strip of PE filled with iron powder being placed around the surface 21, which strip then is induction heated causing the iron powder to melt the plastic surrounding it.

An electrical resistance wire 44 surrounded by an insulation 46 can after that be placed in the groove 42 for heating around the access opening during operation of the cabinet and by that prevent humidity from condensing there.

The cabinet body 12 is at the opening 16 surrounded by a frame 48 of a magnetic material such as iron. The frame 48, which has a L-shaped profile, forms an abutment for hinge elements 50, in which the door is turnably journalled around a vertical axis 52. Magnetic sealing gaskets 54 of the door 18 seal against one leg 56 of the frame 48. The other leg 58 of the frame 48 covers the groove 42.

What is claimed is:

1. Refrigerator or freezer cabinet, the walls of which comprising an inner shell (20) of plastic, an outer shell (22) of plastic and an evacuated heat insulation (28) between the shells, the cabinet being permanently provided with a pump (30) for evacuating the insulation, characterized in that each one of the inner shell (20) and the outer shell (22) at an access opening (16) of the cabinet has an end part (24 and 26, respectively), both of which being directed away from the opening (16) in planes which are parallel with the plane (16) of the opening, the end parts being joined together by means of welding or gluing along a surface (21), which extends around the opening and is parallel with the plane (16) or the opening and the end parts (24 and 26, respectively) end on level (38) with the outer surface (40) or the outer shell.

2. Cabinet according to claim 1, characterized in that a groove (42) is formed beneath the end part (26) of the outer shell (22).

* * * * *